United States Patent
Pietryga

[11] Patent Number: 5,924,767
[45] Date of Patent: Jul. 20, 1999

[54] VENTILATED MOTOR VEHICLE SEAT CUSHION

[76] Inventor: Zenon Pietryga, 901 Salem Woods Dr., Raleigh, N.C. 27615

[21] Appl. No.: 09/241,106

[22] Filed: Feb. 1, 1999

Related U.S. Application Data

[63] Continuation-in-part of application No. 09/099,643, Jun. 18, 1998., abandoned

[51] Int. Cl.[6] ........................................................ A47C 7/74
[52] U.S. Cl. ................................. 297/180.13; 297/180.11
[58] Field of Search .......................... 297/180.11, 180.13, 297/180.14, 452.46, 452.47; 5/423, 652.2, 726

[56] References Cited

U.S. PATENT DOCUMENTS

| | | | |
|---|---|---|---|
| 2,931,286 | 4/1960 | Fry ...................................... | 297/180.13 |
| 3,266,064 | 8/1966 | Figman ................................. | 5/423 X |
| 3,486,177 | 12/1969 | Marshack ........................... | 297/180.13 |
| 3,529,310 | 9/1970 | Olmo ................................. | 297/180.13 |
| 4,981,324 | 1/1991 | Law ....................................... | 5/423 X |
| 5,016,302 | 5/1991 | Yu ....................................... | 297/180.13 |
| 5,372,402 | 12/1994 | Kuo .................................... | 297/180.13 |
| 5,473,783 | 12/1995 | Allen ....................................... | 5/652.2 |
| 5,613,729 | 3/1997 | Summer, Jr. ....................... | 297/180.13 |

*Primary Examiner*—Peter R. Brown
*Attorney, Agent, or Firm*—Mills Law Firm PLLC

[57] ABSTRACT

A ventilated seat cushion detachably connectable to a source of forced air within a motor vehicle to provide cooling and heating of an occupant of the seat cushion is disclosed. The present seat cushion is connectable to a source of forced air by a flexible air hose which is in fluid communication with an air intake manifold internally of the cushion that distributes forced air through a series of perforated plastic tubing members. The forced air is discharged through a plurality of vents formed through the outer layers of the cushion so as to be delivered directly to those portions of the seat occupant in contact with the cushion. In one embodiment the ventilated seat cushion is constructed as an after-market device for detachable connection to the heating and/or air conditioning outlets of the motor vehicle. In an alternative embodiment the present seat cushion is permanently integrated into the understructure of the motor vehicle seat at the time of manufacture.

9 Claims, 2 Drawing Sheets

VENTILATED MOTOR VEHICLE SEAT CUSHION

CROSS-REFERENCE TO RELATED APPLICATION

This Application is a continuation-in-part of application Ser. No. 09/099,643 filed Jun. 18, 1998 by Zenon Pietryga for Air Conditioning Motor Vehicular Seat Cushion.

BACKGROUND OF INVENTION

1. Field of Invention

This invention relates generally to seat cushions and, more particularly, to a ventilated motor vehicle seat cushion.

Whenever a person occupies a chair or other seat there is typically a build up of perspiration on that persons back, upper legs, and rear end. This is especially true in motor vehicles where the interior upholstery becomes warm during periods of hot weather.

Conversely, the seats in a vehicle that is parked outdoors during cold weather can be uncomfortably cold to the occupants until the vehicle is warmed up by the on board heating system.

Numerous ventilated seat cushion devices have been developed to provide forced-air ventilation, and the following U.S. Patents are representative of some of those innovations: U.S. Pat. No. 5,613,729, U.S. Pat. No. 5,372,402, and U.S. Pat. No. 5,016,302.

Although these devices vary from each other in different ways, each exhibits the common characteristic of releasing the forced air internally of the seat cushion and allowing the air conditioned/heated air to diffuse through the padding and/or other cellular material within the cushion thereby cooling/heating the air space within the cushion rather than delivering the forced air directly to the occupant of the cushion.

Thus, the present invention has been developed to provide a ventilated seat cushion wherein the flow of forced air is directed onto the occupant rather than being diffused within the airspace of the cushion.

2. Description of Related Prior Art

U.S. Pat. No. 5,613,729 to Charlie B. Summer, Jr. discloses a ventilated seat cover apparatus including an understructure assembly which includes a pair of side pipe assemblies and a plurality of transverse pipes connected between the side pipe assemblies. The transverse pipes include plural air venting apertures and the side pipe assemblies include end portions which have removable and replaceable pipe plugs. A porous sheet covers the understructure assembly, and a flexible hose is connected to the understructure assembly. A DC battery-powered blower assembly is connected to the flexible hose for use on a vehicle seat. Forced air is released into the air space within the cushion and is diffused through the porous understructure-cover sheet.

U.S. Pat. No. 5,372,402 to Hung-Chou Kuo discloses an air cooled cushion including a main tubular member and a plurality of intermediate tubes extending in perpendicular relation therefrom with each intermediate tube being adapted for pivoting engagement with the main tubular member by dove tail connections. Thus, the back and seat portions of the cushion are adapted for adjustable, pivoting movement to fit the contour of the seat whereon the device is employed. An electric air blower is connected with the tubing members and forced air is released internally of the cushion through perforated tubing members and diffuses through a porous cover.

U.S. Pat. No. 5,016,302 to Kaung M. Yu discloses a motive air seat cushion comprising an envelope consisting of top and bottom wall members wherein the wall members are connected to each other around the edges. An air distribution box having a plurality of holes around the edges is located inside the envelope. An air inlet opening is connected to the box through the envelope for permitting air to enter the box. Air discharge openings are located around the edges of the envelope for air to exit. Flexible hollow supporting paddings are provided inside the box and the envelope, thus allowing air to enter the box and diffuse through the envelope.

U.S. Pat. No. 2,931,286 to Walter L. Fry, Sr., et al discloses a fluid conduit article of manufacture for use with a seat cushion having sides, bottom surface, and a foraminous top surface, and a cooling attachment comprising an impervious distributing member adapted to be detachably mounted on the cushion. The distributing member is attachable to the fresh air vent system or air conditioning system of a motor vehicle.

U.S. Pat. No. 3,529,310 to Giuseppe Olmo discloses a process to ventilate stuffings of cellular material the inside of which is provided with ducts that can be connected at one end thereof with a compressed air or decompressed air generator so as to distribute the air within the stuffing material for ventilation purposes. The stuffing material is intended for use in a variety of products such as mattresses, arm chairs, and the seats of motor vehicles.

U.S. Pat. No. 3,486,177 to Irving L. Marshack discloses a fluid pervious cellular cushion of a rubber-like material adapted to receive fluids under pressure and to disburse them about an occupant without the build-up of excessive back pressure in the construction.

SUMMARY OF THE INVENTION

After much study of the above described problem, the present invention has been developed to provide a ventilated seat cushion for motor vehicles which is detachably connected to a source of forced air such as the vehicle's air conditioning or heating units. The present seat cushion consists of a substructure assembly including an air intake manifold which distributes the forced air into a plurality of flexible plastic tubing members which are disposed internally of the seat cushion and extend along the mid-line and/or side edges of the cushion to the full length thereof. Each tubing member is perforated at regular intervals to provide air discharge openings to release forced air through corresponding air vents in the seat and back portions of the cushion which come into contact with the user of the cushion.

In this manner the cooled or heated forced air flows directly onto these portions of the user i.e. back and rear end of the user which are in direct contact with the seat cushion.

The present seat cushion is designed to function both as an after-market device or to be integrated into the automobile seat at the time of manufacture.

In view of the above it is an object of the present invention to provide a ventilated seat cushion which is detachably connectable to a source of forced air in a motor vehicle including both heating and air conditioning outlets.

Another object of the present invention is to provide a ventilated seat cushion having an internal substructure including an air intake manifold and a plurality of perforated tubing members to provide for the discharge of forced air from air vents forned in the cushion.

Another object of the present invention is to provide a ventilated seat cushion wherein the perforated discharge openings formed in the tubing members are disposed in alignment with corresponding air vent openings in the outer surface of the cushion to deliver forced air onto portions of the user in direct contact with the cushion.

Another object of the present invention is to provide a ventilated seat cushion which is designed both as an aftermarket device or which can be integrated into the motor vehicle seat at the time of manufacture.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
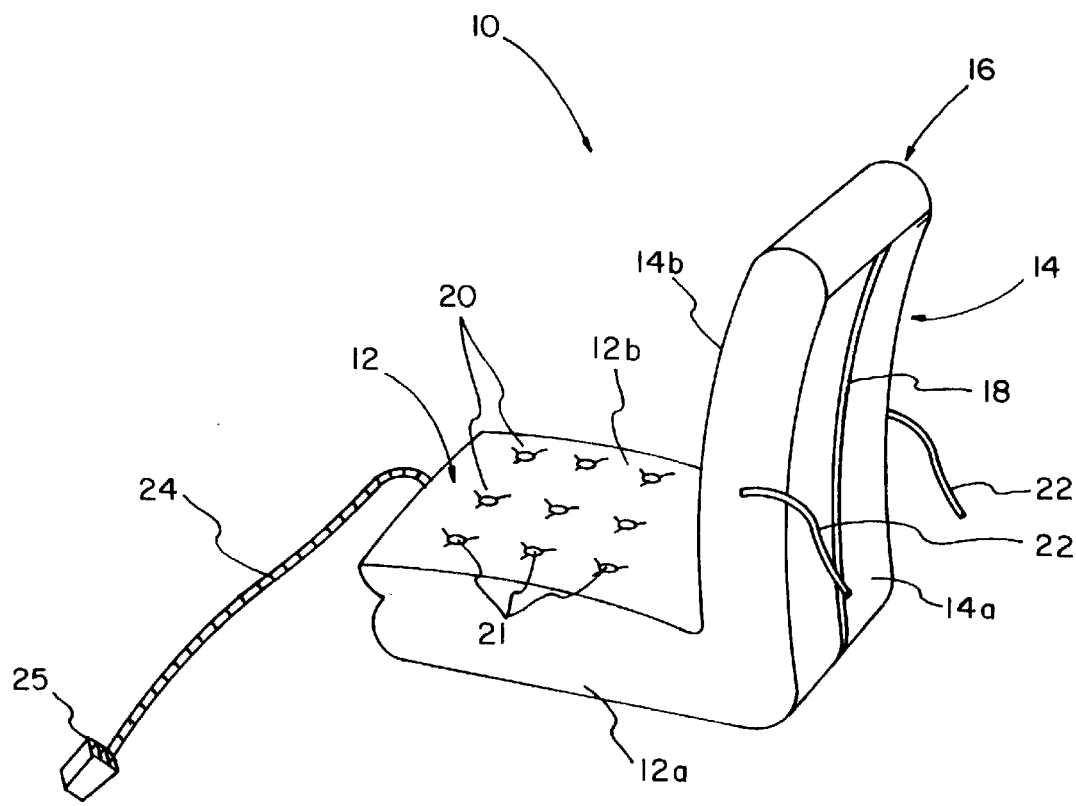
FIG. 1 is a perspective view of one embodiment of the seat cushion of the present invention.

With further reference to the drawings there is shown therein a seat cushion in accordance with the present invention, indicated generally at 10 and illustrated in FIG. 1. In this embodiment the seat cushion 10 includes a seat portion 12 integrally formed with an upright back portion 14 so as to generally conform to the contour of a motor vehicle seat (not shown).

In the preferred embodiment the seat cushion 10 includes an outer slip cover 16 having a continuous fastener 18 disposed along the center line of the reverse sides 14a and 12a of both the back portion 14 and the seat portion 12. The slip cover 16 functions to define the overall shape of the cushion 10 and also to contain the internal components of the seat cushion as described hereinafter in further detail.

In the embodiment shown the slip cover 16 is constructed of a durable upholstery cloth or other suitable material and will be available in a variety of colors and textures to match the existing automobile upholstery.

An advantageous feature of the present seat cushion is that the reverse sides 12a and 14a of the seat and back portions 12 and 14 respectively are constructed of a material such as that sold under the tradename Mighty Grip to frictionally engage the underlying automotive upholstery which might otherwise slide from its position as an occupant takes his/her seat on the cushion.

Since such frictional gripping materials are well known to those skilled in the art, further detailed discussion of the same is not deemed necessary.

Additional tie down straps 22 are provided to secure the cushion 10 in the desired position. The tie down straps 22 include mating strips of a hook and loop type fastener such as that sold under the tradename Velcro.

Since such Velcro fasteners are well known to those skilled in the art, further detailed discussion of the same is not deemed necessary.

The front surface 14b of the back portion 14 and the upward facing surface 12b of the seat portion 12 are provided with a plurality of air vents 20 for the delivery of forced air to portions of the occupant that are in direct contact with the seat cushion 10.

The cushion 10 is detachably connectable to a source of forced air i.e. air conditioner or heater by a flexible air hose 24 including an adapter 25.

Figure 2:
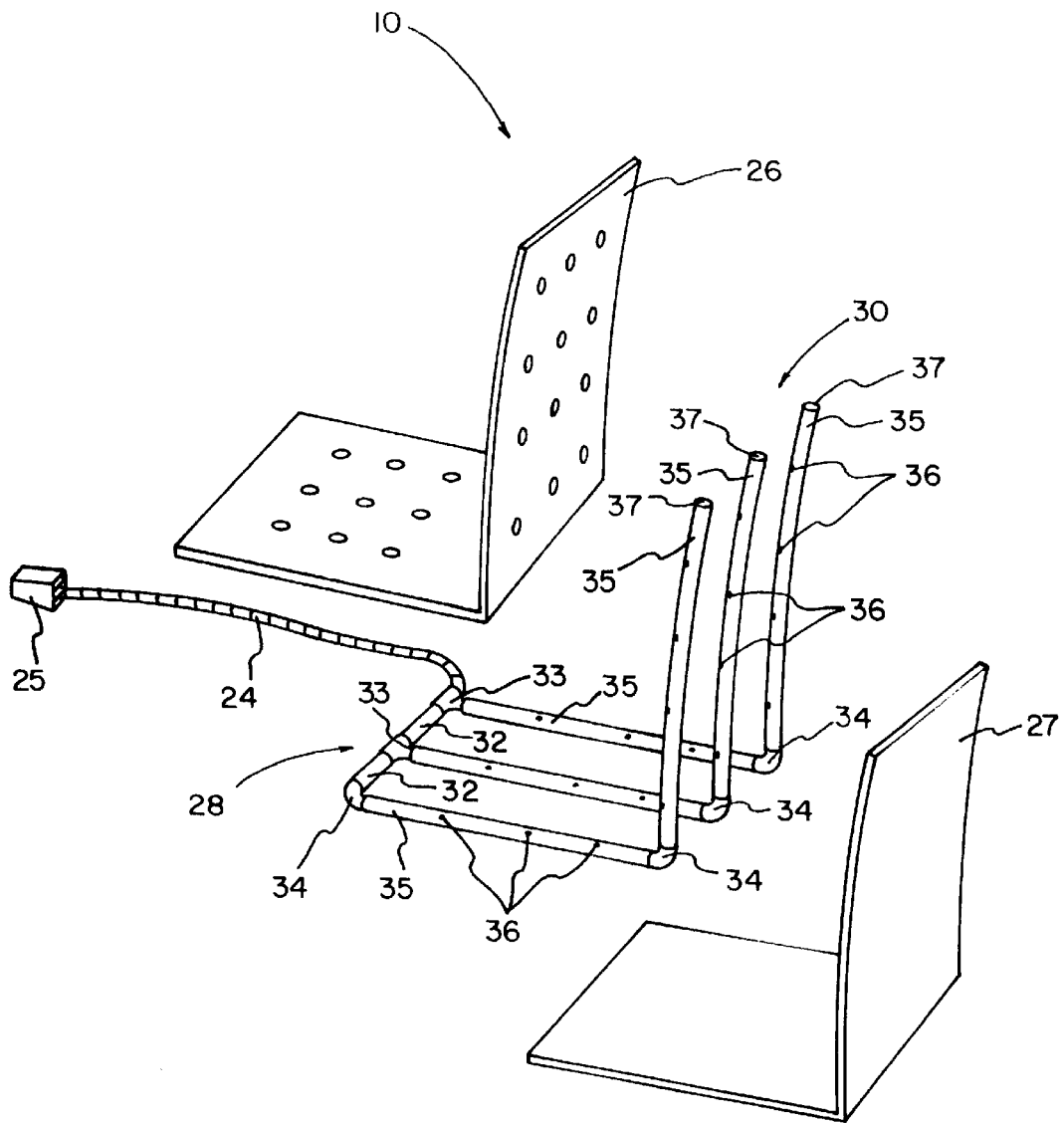
FIG. 2 is an exploded view of the present seat cushion showing the internal structure thereof.

In the preferred embodiment as depicted in FIG. 1, the vents 20 are defined by a plurality of grommet fittings 21 which extend through the slip cover 16 and into an internal padding layer 26 as more clearly shown in FIG. 2, wherein the slip cover 16 has been removed for clarity. The inside diameter of grommet fittings 21 is in the range of 1/8" to 3/8" with the 3/8" being highly preferred and providing optimum air flow.

It will be understood that the upper padding layer 26 is fixedly attached to the slip cover 16 by the installation of grommet fittings 21 therethrough. In addition, the slip cover 16 is sewn to the padding layer 26 so as to provide a finished or tucked appearance to the body contacting surfaces 12b and 14b of the cushion as shown in FIG. 1.

Since grommet fittings and the installation thereof are well known to those skilled in the art, further detailed discussion of the same is not deemed necessary.

It will be seen in FIG. 2 that the flexible air hose 24 is connected in fluid communication with an air manifold indicated generally at 28, which in turn delivers the flow of air to an air tube assembly, indicated generally at 30. In the preferred embodiment air hose 24 is fabricated from a corrugated plastic tubing which is relatively thin walled for maximum flexibility.

In the embodiment shown the manifold 28 is constructed of plastic tubing members 32 of a predetermined length interconnected by tee fittings 33 and elbow fittings 34 as appropriate for the particular configuration of the tubing assembly 30.

From the manifold 28 the forced air flows into perforated tubing members 35 having a plurality of perforations 36 extending through one wall thereof at predetermined intervals. The terminal end of each tubing member 25 is closed by a plug fitting 37.

In the preferred embodiment both tubing members 32 and 25 are constructed of 3/4" I.D.×1" O.D. plastic tubing, which has been determined to provide optimum air flow on the motor vehicles tested.

The perforations 36 are aligned linearly one to another on each perforated tube 35 at predetermined intervals in a pattern corresponding to that of the air vents 20 provided by the installation of grommet fittings 21 on both the seat and back portions 12 and 14 respectively.

In an assembly procedure of the embodiment shown in FIG. 2 the slip cover 16 is constructed using a pattern (not shown) to lay out each of the panels of material required in the construction of the seat cushion 10 and the respective panels are sewn together using standard upholstering techniques in a known manner.

During fabrication of the slip cover 16 the padding layer 26 is attached to the inside surface of the back and seat surfaces 12b and 14b respectively being bent at a right angle to define the shape of the seat cushion 10. Various stitching patterns e.g. squares, diamond shapes, may be utilized to provide a desired finished appearance.

Thereafter, a pattern for the vents 20 in both the back and seat portions is laid out and a plurality of grommet fittings 21 are installed through the slip cover 16 and the underlying padding layer 26 to create the vents 20 from which the forced air will be discharged.

Next, the air tube assembly 30 together with the attached manifold 28 is installed within the slip cover 16 in juxtaposition to the padding layer 26 such that perforations 36 are disposed in alignment with the vents 20.

The manifold 28 with the attached air tube assembly 30 is secured in this position by heat welding, fasteners and/or adhesives and a lower padding layer 27 of open cell foam material is similarly secured to the back of the upper padding layer 26 to contain and protect the air tube assembly 30.

In practical use the assembled seat cushion 10 is disposed on the desired seat in the motor vehicle and the air hose 24 with the adapter 25 is connected to the source of forced air to be used i.e. air conditioner outlet or heater outlet. The forced air is conducted through the air hose 24 and through the air manifold 28 and is distributed into the air tube assembly 30 and delivered through the vents 20 formed by the grommet fittings 21.

In this manner forced air is released directly onto those portions of the occupant contacting the seat cushion 10 rather than into the air space within the cushion as found in the prior art. In this manner cooling and/or heating of the occupant of the seat cushion 10 proceeds more efficiently.

Although the seat cushion 10 has been described hereinabove as an after-market device for use on an existing motor vehicle seat, it will be understood that the present seat cushion can be integrated into the automobile seat at the time of manufacture. In such an embodiment (not shown) the present seat cushion 10 with the slip cover 16 removed is permanently installed in the understructure of the automotive seat and the outer finished upholstery including a plurality of air vents 20 formed therein is disposed in overlying relation to the air tube assembly 30.

In such an embodiment various alternative connection sites for the attachment of the air supply hose 24 to the air manifold may be provided.

From the above it can be seen that the ventilated seat cushion of the present invention provides a simple yet practical solution to the problem of cooling and/or heating the occupant of a motor vehicle during extreme weather conditions.

The present seat cushion offers advantages over the prior art in that the forced air is delivered through an array of perforated tubing members contained in the cushion which discharge the forced air through vents formed in the cushion directly onto those portions of the occupant in contact with the cushion to provide instant cooling and/or heating.

The terms "upper", "lower", "side" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A ventilated seat cushion having seat and back portions for use with a source of forced air on a motor vehicle comprising:
   air intaking means including an air supply hose for attaching said source of forced air in fluid communication with said cushion;
   air discharging means connected to said air intaking means and including at least one perforated tubing member wherein a plurality of perforations are formed at predetermined intervals forming a pattern; and
   padding means disclosed in juxtaposition to said air discharging means, said padding means having a plurality of air vents formed therein at said predetermined intervals forming said pattern such that said air vents are aligned with said perforations permitting said forced air to be discharged from said air vents directly onto those portions of a person in contact with said cushion.

2. The seat cushion of claim 1 wherein said air intaking means further includes an air manifold contained within said cushion and in fluid communication with said air supply hose, said air manifold distributing said forced air to said at least one tubing member.

3. The seat cushion of claim 2 wherein said air discharging means includes a plurality of said perforated tubing members in fluid connection with said air manifold, each of said tubing members having a plurality of said perforations at said intervals.

4. The seat cushion of claim 1 wherein said padding means includes an upper and a lower padding layer disclosed in generally parallel relation with said air discharging means being interposed therebetween, said upper padding layer having a plurality of air vents formed therein at said predetermined intervals forming said pattern such that said air vents are aligned with said perforations.

5. The seat cushion of claim 4 wherein said padding means is fabricated from an open cell foam material.

6. The seat cushion of claim 1 further including an outer slip cover enclosing said air intaking means, said air discharging means, and said air padding means therein, said slip cover being fixedly attached to said seat portion and said back portion of said cushion, said slip cover including a continuous closure on a reverse side thereof and extending the entire length thereof to permit interior access.

7. The seat cushion of claim 6 wherein said continuous closure is a zipper fastener.

8. The seat cushion of claim 7 wherein said slip cover includes a pair of tie down straps for attachment of said cushion to an automotive seat, said tie down straps including mating portions of a hook and loop type fastener.

9. The seat cushion of claim 1 wherein said air supply hose includes a flexible adapter formed at a terminal end thereof for attachment to said source of forced air.

\* \* \* \* \*